# 3,338,936
π-ALLYLIRON TRICARBONYL HALIDES AND PROCESS OF PREPARATION

Richard F. Heck, Wilmington, Del., assignor to Hercules Incorporated, a corporation of Delaware
No Drawing. Filed July 29, 1963, Ser. No. 298,439
20 Claims. (Cl. 260—439)

This invention relates to novel π-allyliron tricarbonyl halides and a process for producing the same.

According to the present invention, π-allyliron tricarbonyl halides are produced by reacting together ingredients consisting essentially of iron pentacarbonyl and an allylic halide in the presence of ultraviolet light, said allylic halide having the formula

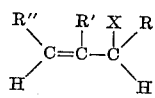

in which X represents a halogen of the group consisting of chlorine, bromine, and iodine; in which R, R', and R" each represents a substituent of the group consisting of hydrogen, chlorine, bromine, iodine, phenyl, lower carboalkoxy, lower carboalkyl, lower alkoxy, and lower alkyl groups having 1 to 4 carbon atoms in the alkyl and alkoxy groups; and in which any two of R, R' and R" linked together form carbon rings having 4 to 10 carbon atoms in the ring.

The reaction involved is expressed by the following equation:

(I)

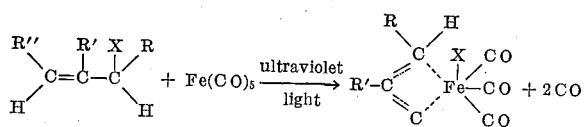

in which the symbols X, R, R' and R" are the same as set forth above. It will be seen that the products formed are π-allyliron tricarbonyl halide complexes formed by reaction of equimolecular proportions of the allylic halide and iron pentacarbonyl with elimination of two moles of carbon monoxide. The reaction is most conveniently carried out in an inert atmosphere such as nitrogen by irradiating a solution of the allylic halide and iron pentacarbonyl in an inert solvent at temperatures below about 50° C. in a closed vessel which is at least partly transparent to ultraviolet light. This is because iron pentacarbonyl and the π-allyliron tricarbonyl halides which are formed are more or less reactive toward oxygen, particularly when they are in solution.

The novel π-allyliron tricarbonyl halides of this invention are characterized by the formula

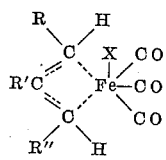

in which X represents a halogen of the group consisting of chlorine, bromine, and iodine; in which R, R' and R" each represents a substituent of the group consisting of hydrogen, chlorine, bromine, iodine, phenyl, lower carboalkoxy, lower carboallyl, and lower alkoxy having 1 to 4 carbon atoms in the alkyl and alkoxy groups, not more than two of said R, R' and R" being hydrogen; and in which any two of R, R' and R" linked together form carbon rings having 4 to 10 carbon atoms in the ring. The π-allyliron tricarbonyl halide complexes are all crystalline solids and vary in color from yellow-brown for the chlorides to dark red-brown for the iodides. In the solid state these complexes are usually stable for short periods in contact with air; however, in solution they may decompose relatively rapidly in contact with air. The iodides are more stable than the bromides which in turn are more stable than the chlorides. However, these complexes either in the solid state or in solution in an inert solvent are stable indefinitely when stored at ordinary room temperatures in an inert atmosphere. They all react with excess triphenylphosphine to evolve one mole of CO and form monotriphenylphosphine complexes.

As pointed out hereinbefore, one of the essential reactants for preparing the π-allyliron tricarbonyl halide complexes of this invention is an allylic halide having the formula

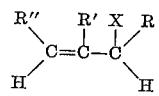

in which X represents a halogen of the group consisting of chlorine, bromine and iodine; in which R, R' and R" is each a substituent of the group consisting of hydrogen, chlorine, bromine, iodine, phenyl, lower carboalkoxy, lower carboalkyl, lower alkoxy, and lower alkyl groups having 1 to 4 carbon atoms in the alkyl and alkoxy groups; and in which any two of R, R' and R" linked togther form carbon rings having 4 to 10 carbon atoms in the ring.

Typical carboalkoxy, carboalkyl, alkoxy, and alkyl substituents in the above allylic halide formula include carbomethoxy, carboethoxy, carbopropoxy, carboisopropoxy, carbobutoxy, carboisobutoxy, carbosecondary butoxy, carbotertiary butoxy, carbomethyl, carboethyl, carbopropyl, carboisopropyl, carbobutyl, carboisobutyl, carbosecondary butyl, carbotertiaty butyl, methoxy, ethoxy, propoxy, isopropoxy, butoxy, isobutoxy, secondary butoxy, tertiary butoxy, methyl, ethyl, propyl, isopropyl, butyl isobutyl, secondary butyl, and tertiary butyl. Some typical allylic halides for the purposes of this invention include by way of example, allyl chloride, allyl bromide, allyl iodide, crotyl chloride, crotyl bromide, crotyl iodide, 2-methallyl chloride, 2-methallyl bromide, 2-methoxy allyl bromide, 2-ethoxy allyl chloride, 3-chloro-1-butene, 3-bromo-1-butene, 2,3-dibromo-1-propene, 2,3-dichloro-1-propene, 1-chloro-2-pentene, 3-chloro-1-pentene, 1-bromo-3-methyl-2-butene, 3-chlorocyclohexene, 3-bromocyclohexene, 3-chlorocyclopentene, 1-chloro-2-phenyl-2-propene, methyl-4-bromo-2-butenoate, ethyl 4-iodo-2-butenoate,, 1-chloro-5-methoxy-2-pentene, 1-chloro-3-phenyl - 2 - propene, 3-bromo-1-phenyl-1-propene, 1-bromo-4-keto-2-pentene.. 1-bromo-4-keto-4-phenyl-2-butene, and the like.

The allylic halides of this invention are well known organic chemicals and various methods are known for their preparation. Many of these are commercially available on a large scale. One skilled in the art will recognize, of course, that some allylic halides, particularly some allylic iodides, such as 2-methallyl iodide, are rather unstable, and for this reason preparation of π-allyliron tricarbonyl halides directly from such unstable allylic halides is quite difficult. However, in accordance with this invention, it has been found that the π-allyliron tricarbonyl chlorides and π-allyliron tricarbonyl bromides can be readily converted into the corresponding π-allyliron tricarbonyl iodides by reaction with an alkali metal iodide such as lithium iodide. Similarly, π-allyliron tricarbonyl bromides can be readily prepared by reacting the correspondng π-allyliron tricarbonyl chlorides with an alkali metal bromide such as lithium bromide. The iodides and bromides of the other alkali metals, namely, sodium, potassium, rubidium, and cesium, may also be used for this purpose. This makes possible the preparation of many π-allyliron tricarbonyl bromides and iodides which otherwise would be difficult to prepare directly from unstable corresponding allylic bromides or iodides.

As shown by Equation I hereinbefore, the allylic halide and iron pentacarbonyl react in equimolecular proportions to produce the π-allyliron tricarbonyl halide complexes of this invention, and for optimum results it is desirable to employ approximately equimolecular proportions of the reactants. However, the invention is not limited to the use of equimolecular proportions of either the allylic halide or the iron pentacarbonyl, and these two essential reactants can be employed in any proportion.

Iron pentacarbonyl, the other essential reactant for the purpose of this invention, is commercially available. It is a yellow liquid.

As pointed out hereinbefore, the reaction is most conveniently carried out in solution in an inert solvent, and a variety of such solvents can be used as the inert reaction medium for the process of this invention. Suitable inert solvents for the purposes of this invention include by way of example, saturated aliphatic and cycloaliphatic hydrocarbons such as pentane, hexane, heptane, petroleum ether, gasoline, cyclopentane, cyclohexane, methyl cyclohexane, and the like; chlorinated hydrocarbons such as methylene chloride, ethylene dichloride, trichloroethylene, and the like; alkyl and cyclic ethers such as diethyl ether, diisopropyl ether, dibutyl ether, methyl ethyl ether, tetrahydrofuran, dioxane, and the like; and ketones such as acetone, methyl ethyl ketone, diethyl ketone, methyl isobutyl ketone, and the like. The inert solvent, in addition to being nonreactive with the starting reactants and products formed, should also be relatively transparent to ultraviolet light, and should not react under ultraviolet light.

Ultraviolet light promotes the reaction of allylic halides with iron pentacarbonyl in accordance with this invention. The reaction does not proceed at all, or at most only slowly in the absence of ultraviolet light. It has been found that yields of product increased with increasing time of irradiation up to at least 6 days. Usually 2 or 3 days resulted in 20% to 30% yields of π-allyliron tricarbonyl halides. Some insoluble material is always formed during the reaction; presumably ferric or ferrous halide which is readily removed by filtration, centrifugation, or the like. Unreacted allylic halide and iron pentacarbonyl can be recovered for reuse.

Since many of the π-allyliron tricarbonyl halide complexes of this invention tend to decompose at temperatures in the range of 50–100° C., it is generally advisable to employ reaction temperatures below about 50° C., and the most useful temperature range is between about +50° C. and −50° C. However, temperatures as low as −100° C. can be employed.

The π-allyliron tricarbonyl halides produced in accordance with this invention are useful as antiknock agents when added to gasoline. They are also useful for accelerating the drying of paints.

The general nature of the invention has been set forth and the following examples are presented as specific illustrations thereof.

*Example 1*

A nitrogen-filled, capped Pyrex bottle containing 80 milliliters of pentane, 10 milliliters of allyl chloride, and 10 milliliters of iron pentacarbonyl was irradiated with a General Electric Company H100-A4 ultraviolet lamp for about 24 hours while being cooled to about 20° C. by immersing it in running tap water. The reaction mixture solution in the bottle was then centrifuged to remove a small amount of insoluble material. The centrifuged reaction mixture solution was then cooled to about −80° C. whereupon yellow crystals of π-allyliron tricarbonyl chloride were deposited. The crystalline π-allyliron tricarbonyl chloride product was recovered from the reaction mixture solution by centrifuging, and the mother liquor was again irradiated in a nitrogen-filled capped Pyrex bottle for a further 24-hour period with cooling by immersion in running tap water, and then cooled to about −80° C. A second crop of π-allyliron tricarbonyl chloride crystals was thus obtained, which was recovered from the reaction mixture solution by centrifuging. The two crops of π-allyliron tricarbonyl chloride crystals were combined and recrystallized three times from diethyl ether at −80° C. to yield 2.8 grams of a purified π-allyliron tricarbonyl chloride product having a melting point of 80.6°–83.2° C. with decomposition. This product was found upon analysis to contain 33.78% carbon and 2.62% hydrogen. The theoretical calculated values for carbon and hydrogen content of pure π-allyliron tricarbonyl chloride are 33.30% for carbon and 2.33% for hydrogen.

The nuclear magnetic resonance spectrum for the above product in deuterochloroform solution consisted of a multiplet and two doublets in an area ratio of 1:2:2. At 60 megacycles, using benzene as an external standard the chemical shifts in cycles per second were 80, 116, and 195, respectively, indicating the presence of a symmetrically π-bonded allyl group.

*Example 2*

Following the same procedure set forth in Example 1, a solution of 10 milliliters of allyl bromide, 10 milliliters of iron pentacarbonyl, and 100 milliliters of pentane was irradiated for 72 hours. After removal of a small amount of insoluble material by centrifuging, the clarified reaction mixture solution upon cooling to −80° C. deposited yellow-brown crystals of π-allyliron tricarbonyl bromide which were recovered. Additional product was obtained by further irradiation of the mother liquor as in Example 1 and was combined with the first crop of π-allyliron tricarbonyl bromide crystals. Three recrystallizations from diethyl ether at −80° C. yielded a purified π-allyliron tricarbonyl bromide product having a melting point of 92.5°–93° C. with decomposition. This product was found upon analysis to contain 28.08% carbon and 2.12% hydrogen. The theoretical calculated values for carbon and hydrogen content of pure π-allyliron tricarbonyl bromide are 27.62% for carbon and 1.93% for hydrogen.

The nuclear magnetic resonance spectrum measured under the same conditions as described in Example 1 was similar to that of π-allyliron tricarbonyl chloride. The chemical shift values were 130, 120 and 176 cycles per second, respectively.

*Example 3*

A nitrogen-filled Pyrex tube containing 5 milliliters of pentane, 1.0 milliliter of allyl iodide, and 1 milliliter of iron pentacarbonyl was irradiated for 24 hours with cooling as in Example 1. The product, π-allyliron tricarbonyl iodide, was isolated as described in Example 1, and after three recrystallizations from pentane at −80° C., yielded red-brown needles of a purified π-allyliron tricarbonyl iodide product having a melting point of 97°–98° C. with decomposition. This product was found upon analysis to contain 23.81% carbon and 1.79% hydrogen. The theoretical calculated values for carbon and hydrogen content of pure π-allyliron tricarbonyl iodide are 23.40% for carbon and 1.64% for hydrogen.

*Example 4*

Crotyl chloride was reacted with iron pentacarbonyl by the procedure of Example 3. The product was 1-methyl-π-allyliron tricarbonyl chloride having a melting point of 57.6°–57.8° C. with decomposition.

*Example 5*

Following the same procedure described in Example 1, a solution of 50 milliliters of pentane, 5 milliliters of crotyl bromide, and 5 milliliters of iron pentacarbonyl was irradiated with cooling for 18 hours in a nitrogen-filled, capped Pyrex bottle. The reaction mixture was centrifuged to remove a small amount of insoluble material and was then cooled to −80° C., whereupon brown crystals of 1-methyl-π-allyliron tricarbonyl bromide were deposited. This crystalline product was recrystallized three times from pentane at −80° C. to yield 1.2 grams of a purified 1-methyl-π-allyliron tricarbonyl bromide product having a melting point of 31.8°–33.0° C. This product was found upon analysis to contain 31.07% carbon and 2.78% hydrogen. The theoretical calculated value for carbon and hydrogen content of pure 1-methyl-π-allyliron tricarbonyl bromide are 30.58% for carbon and 2.57% for hydrogen.

Example 6

Following the same procedure described in Example 1, a solution of 5-milliliters of 2-methallyl chloride, 5 milliliters of iron pentacarbonyl, and 50 milliliters of pentane was irradiated for 48 hours. After removal of a small amount of insoluble material by centrifuging, the clarified reaction mixture solution upon cooling to −80° C. deposited yellow-brown crystals of 2-methyl-π-allyliron tricarbonyl chloride which were recovered. Additional product was obtained by further irradiation of the mother liquor as in Example 1, and was combined with the first crop of 2-methyl-π-allyliron tricarbonyl chloride crystals. Two recrystallizations from diethyl ether at −80° C. yielded long yellow needles of a purified 2-methyl-π-allyliron tricarbonyl chloride product having a melting point of 98°–99° C. with decomposition. This product was found upon analysis to contain 36.67% carbon and 3.22% hydrogen. The theoretical calculated values for carbon and hydrogen content of pure 2-methyl-π-allyliron tricarbonyl chloride are 36.49% for carbon and 3.06% for hydrogen.

Example 7

Following the same procedure described in Example 1, a solution of 0.3 milliliter of methyl 4-bromo-2-butenoate, 1 milliliter of iron pentacarbonyl, and 5 milliliters of pentane was irradiated for 48 hours. After removal of a small amount of insoluble material by centrifuging, the clarified reaction mixture solution upon cooling to −80° C. deposited orange-brown crystals of 1-carbomethoxy-π-allyliron tricarbonyl bromide. This crystalline product was recrystallized twice from pentane at −80° C. to yield a purified 1-carbomethoxy-π-allyliron tricarbonyl bromide product having a melting point of 72°–73° C. with decomposition. This product was found upon analysis to contain 30.61% carbon and 2.46% hydrogen. The theoretical calculated values for carbon and hydrogen content of pure 1-carbomethoxy-π-allyliron tricarbonyl bromide are 30.13% for carbon and 2.21% for hydrogen.

Example 8

A solution of 0.43 gram of π-allyliron tricarbonyl chloride in pentane was added to a solution of 0.5 gram of lithium iodide in 5.0 milliliters of acetone at 25° C. The resulting mixed solution immediately turned dark red and after 2 hours the solvent was evaporated in vacuum. The residue was extracted several times with fresh pentane, and the extracts were combined and cooled to −80° C. Long dark brown needles of π-allyliron tricarbonyl iodide having a melting point of 100.8–101.0° C. with decomposition were deposited. This was the same compound as obtained in Example 3.

Example 9

The procedure described in Example 8 was repeated, substituting 2-methyl-π-allyliron tricarbonyl chloride in place of π-allyliron tricarbonyl chloride. The product obtained was 2-methyl-π-allyliron tricarbonyl iodide having a melting point of 103.5°–104.0° C. with decomposition. This product was found upon analysis to contain 26.33% carbon and 2.39% hydrogen. The theoretical calculated values for carbon and hydrogen content of pure 2-methyl-π-allyliron tricarbonyl iodide are 26.12% for carbon and 2.19% for hydrogen.

Example 10

Following the procedure described in Example 1, a solution of 1-milliliter of 2,3-dibromo-1-propene, 1 milliliter of iron pentacarbonyl, and 5 milliliters of pentane was irradiated for 48 hours. After removal of a small amount of insoluble material by centrifuging, the clarified reaction mixture upon cooling to −80° C. deposited brown crystals of 2-bromo-π-allyliron tricarbonyl bromide. This crystalline product was recrystallized twice from pentane at −80° C., and the purified product in carbon tetrachloride solution had absorption bands in the infrared region at 4.75μ, 4.86μ, and 4.91μ, said absorption bands being characteristic of the compound 2-bromo-π-allyliron tricarbonyl bromide.

Example 11

3-bromo-1-phenyl-1-propene was reacted with iron pentacarbonyl by the procedure of Example 3, except that methylene chloride was employed as the inert solvent in place of the pentane employed in Example 3. Dark brown crystals of 1-phenyl-π-allyliron tricarbonyl bromide were obtained.

Example 12

3-chlorocyclohexane was reacted with iron pentacarbonyl by the procedure of Example 3, and yellow-brown crystals of 1,3-trimethylene-π-allyliron tricarbonyl chloride were obtained.

Example 13

1-bromo-4-keto-2-pentene was reacted with iron pentacarbonyl by the procedure of Example 3, and dark brown crystals of 1-acetyl-π-allyliron tricarbonyl bromide were obtained.

Example 14

2-ethoxy allyl chloride was reacted with iron pentacarbonyl by the procedure of Example 3, and yellow-brown crystals of 2-ethoxy-π-allyliron tricarbonyl chloride were obtained.

What I claim and desire to protect by Letters Patent is:

1. A process for producing a π-allyliron tricarbonyl halide which comprises reacting together ingredients consisting essentially of iron pentacarbonyl and an allylic halide in the presence of ultraviolet light, said allylic halide having the formula

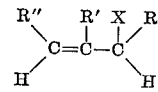

in which X represents a halogen of the group consisting of chlorine, bromine, and iodine; in which R, R', and R'' each represents a substituent of the group consisting of hydrogen, chlorine, bromine, iodine, phenyl, lower carboalkoxy, lower carboalkyl, lower alkoxy, and lower alkyl groups having 1 to 4 carbon atoms in the alkyl and alkoxy groups; and in which any two of R, R' and R'' linked together form carbon rings having 4 to 10 carbon atoms in the ring.

2. A process for producing a π-allyliron tricarbonyl halide which comprises irradiating a solution of iron pentacarbonyl and an allylic halide in an inert solvent with ultraviolet light, said allylic halide having the formula

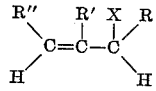

in which X represents a halogen of the group consisting of chlorine, bromine, and iodine; in which R, R', and R'' each represents a substituent of the group consisting of hydrogen, chlorine, bromine, iodine, phenyl, lower carboalkoxy, lower carboalkyl, lower alkoxy, and lower alkyl groups having 1 to 4 carbon atoms in the alkyl and alkoxy groups; and in which any two of R, R' and R'' linked together form carbon rings having 4 to 10 carbon atoms in the ring.

3. The process in accordance with claim 2 in which said solution of iron pentacarbonyl and allylic halide is irradiated with ultraviolet light at temperatures below about 50° C.

4. The process in accordance with claim 2 in which the allylic halide is allyl chloride.

5. The process in accordance with claim 2 in which the allylic halide is allyl bromide.

6. The process in accordance with claim 2 in which the allylic halide is allyl iodide.

7. The process in accordance with claim 2 in which the allylic halide is crotyl chloride.

8. The process in accordance with claim 2 in which the allylic halide is crotyl bromide.

9. The process in accordance with claim 2 in which said allylic halide is 2,3-dibromo-1-propene.

10. The process in accordance with claim 2 in which said allylic halide is methyl 4-bromo-2-butenoate.

11. The process in accordance with claim 2 in which said allylic halide is 3-bromo-1-phenyl-1-propene.

12. The process in accordance with claim 2 in which said allylic halide is 3-chlorocyclohexene.

13. The process in accordance with claim 2 in which said allylic halide is 1-bromo-4-keto-2-pentene.

14. $\pi$-Allyliron tricarbonyl halides having the formula

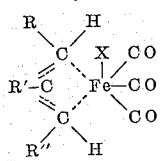

in which X represents a halogen of the group consisting of chlorine, bromine, and iodine; in which R, R' and R" each represents a substituent of the group consisting of hydrogen, chlorine, bromine, iodine, phenyl, lower carboalkoxy, lower carboalkyl and lower alkoxy having 1 to 4 carbon atoms in the alkyl and alkoxy groups, not more than two of said R, R' and R" being hydrogen; and in which any two of R, R' and R" linked together form carbon rings having 4 to 10 carbon atoms in the ring.

15. 1-phenyl-$\pi$-allyliron tricarbonyl bromide.
16. 1,3-trimethylene-$\pi$-allyliron tricarbonyl chloride.
17. 1-acetyl-$\pi$-allyliron tricarbonyl bromide.
18. 2-bromo-$\pi$-allyliron tricarbonyl bromide.
19. 1-carbomethoxy-$\pi$-allyliron tricarbonyl bromide.
20. 2-ethoxy-$\pi$-allyliron tricarbonyl chloride.

References Cited

UNITED STATES PATENTS 3,117,148   1/1964   Ihrman et al. _____ 260—439

OTHER REFERENCES

Impastato et al.: J.A.C.S., vol. 83, Sept. 5, 1961, pp. 3726–3737.

Murdoch et al.: Helv. Chim. Acta., vol. XLV, Fasc. VI, October 1962, pp. 1927–1933.

Plowman et al.: Z. fur Naturforschung, Band 17b, No. 9, September 1962, pp. 575–577.

TOBIAS E. LEVOW, *Primary Examiner.*

E. C. BARTLETT, A. P. DEMERS, *Assistant Examiners.*